United States Patent [19]

Nakajima et al.

[11] Patent Number: 5,264,053

[45] Date of Patent: Nov. 23, 1993

[54] PRODUCTION METHOD FOR A VEHICULAR ENDLESS TRACK BUSHING

[75] Inventors: Masahiro Nakajima; Hisahiko Kusano; Isao Yoshida, all of Chigasaki; Yoshio Hamajima, Toyohashi; Hiroyuki Takeno, Toyokawa, all of Japan

[73] Assignee: Topy Kogyo Kabushiki Kaisha, Tokyo, Japan

[21] Appl. No.: 941,262

[22] Filed: Sep. 4, 1992

Related U.S. Application Data

[63] Continuation-in-part of Ser. No. 678,048, Apr. 1, 1991, abandoned.

[30] Foreign Application Priority Data

Mar. 31, 1990 [JP] Japan ................................. 2-83009

[51] Int. Cl.[5] ........................... C21D 1/10; C21D 1/18
[52] U.S. Cl. .................................... 148/570; 148/574; 148/575
[58] Field of Search ................ 148/567, 570, 574, 575

[56] References Cited

U.S. PATENT DOCUMENTS

5,032,192  7/1991  Tsuchiya et al. .................. 148/16.5

Primary Examiner—R. Dean
Assistant Examiner—Sikyin Ip
Attorney, Agent, or Firm—Cushman, Darby & Cushman

[57] ABSTRACT

A production method for an endless track bushing wherein high-carbon low-alloy steel is selected as a bushing material, the bushing material is quench-hardened without pre-carburizing the bushing material, and then tempered. In the quench-hardening, the bushing material is induction-heated from an outside surface of the bushing material only so that an inside surface of the bushing material is heated to a temperature above and close to a transformation temperature of the high-carbon low-alloy steel, and then the heated bushing material is cooled from the outside surface of the bushing material only so that a residual compressive stress is produced at the inside surface of the bushing material when it has been cooled to an ambient temperature. The thus produced bushing has a high hardness throughout the entire cross section and a high toughness.

16 Claims, 10 Drawing Sheets

PRODUCTION METHOD FOR A VEHICULAR ENDLESS TRACK BUSHING

The present application is a continuation-in-part application of U.S. Pat. Application Ser. No. 07/678,048 filed Apr. 1, 1991, now abandoned.

BACKGROUND OF THE INVENTION

1. Field of the Invention

The present invention relates to a production method for a bushing used in an endless track mounted to vehicles.

2. Description of the Related Art

Figure 1:
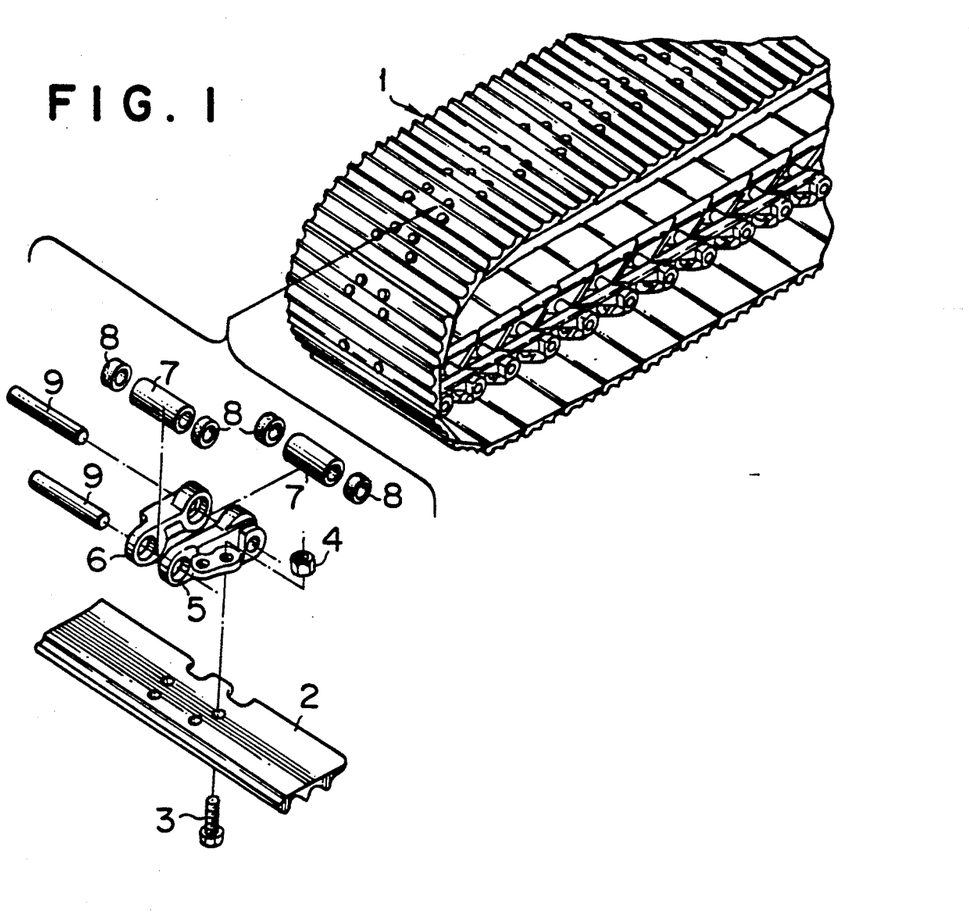
FIG. 1 is a perspective view of a portion of an endless track and the components thereof.

An endless track adapted to be mounted to vehicles (for example, a bulldozer) includes, as shown in FIG. 1, a shoe 2, shoe connecting bolts 3, shoe nuts 4, links 5 and 6, bushings 7, dust seals 8, and pins 9 as one structural unit thereof.

Figure 2:
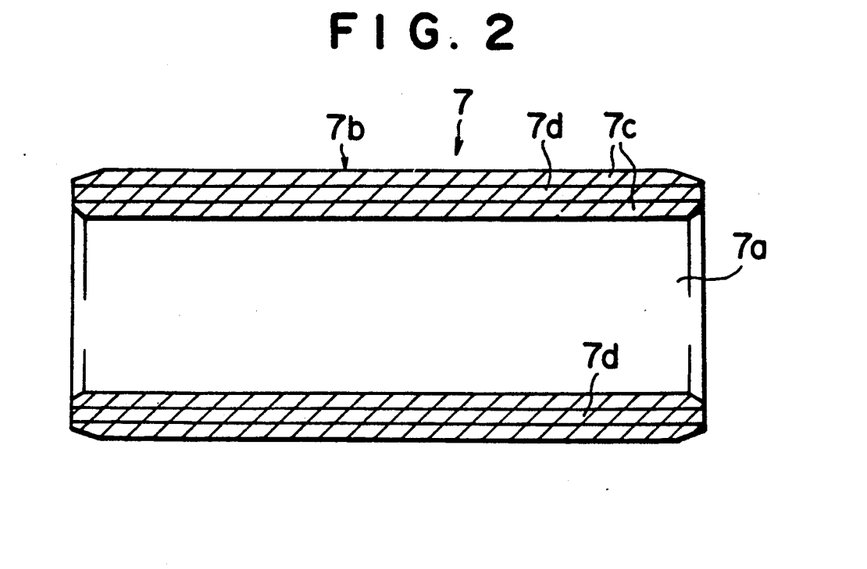
FIG. 2 is a cross-sectional view of a bushing heat-treated according to the first or second related art.

The bushing 7 used for an endless track is shown in FIG. 2 in an enlarged manner. For the endless track bushing, abrasion resistance is required at an inside surface 7a, an outside surface 7b and portions 7c adjacent the surfaces 7a and 7b, and strength and toughness are required at the entire portions including a core portion 7d to endure a load imposed on the bushing.

To satisfy those requirements, the following production methods of an endless track bushing have been proposed:

(a) A production method as proposed in Japanese Patent Publication SHO 52-34806, wherein case hardening steel (JIS (Japanese Industrial Standard): SCM415), which is a low-carbon steel, is selected as the bushing material. The bushing material is carburized at portions near the surfaces thereof in the furnace and is cooled to an ambient temperature. Then, the bushing material is heated and quenched by oil, and then the bushing material is tempered. The required hardness for abrasion resistance at the surfaces is obtained through the carburizing and the heat treatment after the carburizing, and the required strength and toughness are obtained through the quenching and tempering. This method will be called a first related art hereinafter.

Figure 3:
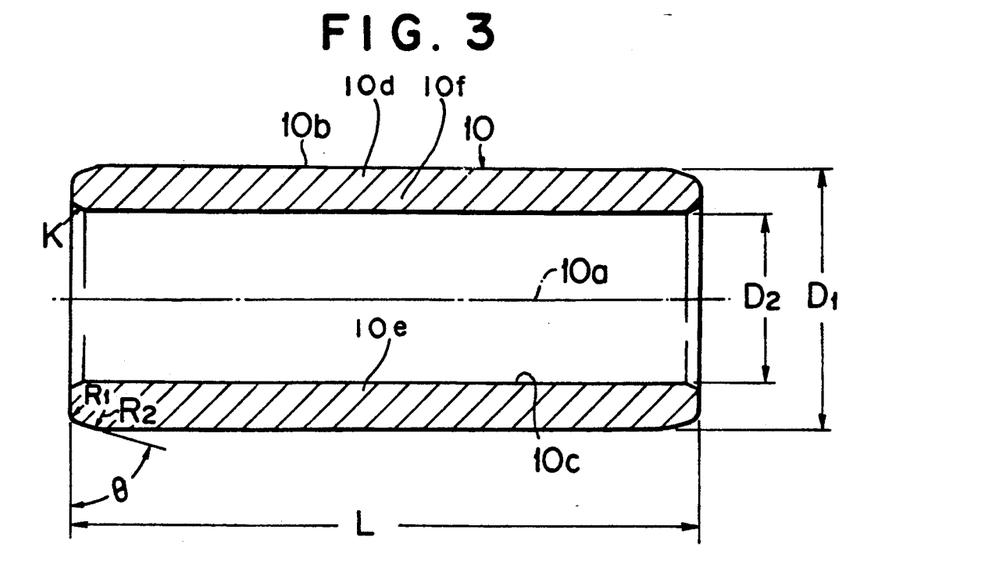
FIG. 3 is a cross-sectional view of a bushing heat-treated according to the present invention and the third related art.

(b) A production method as proposed in Japanese Patent Publication HEI 1-259129 published Oct. 16, 1989 (Japanese Patent Application SHO 63-87338) and as shown in FIG. 3. In the method, a bushing material 10 of medium-carbon steel is carburized, and then the bushing material is cooled to an ambient temperature. Then, the bushing material is induction-heated and quenched beyond an outer carburized layer from an outside surface 10b thereof while the bushing material 10 is rotated about an axis 10a thereof so that an outer effective hardened layer having a hardness greater than a specified effective hardness is formed. Then, the bushing material is induction-heated and quenched beyond an inner carburized layer from an inside surface 10c thereof while the bushing material 10 is rotated about the axis 10a and the outside surface is cooled by coolant whereby an inner effective hardened layer having a hardness greater than the specified effective hardness is formed and a tempered layer having a hardness less than the specified effective hardness is formed between the inner and outer effective hardened layer. Finally, the bushing material is tempered at low temperatures. This method will be called a second related art hereinafter.

(c) A production method as proposed in Japanese Patent Application SHO 63-320420 (Japanese Publication HEI 2-169375 which corresponds to U.S. Pat. Application No. 07/454,004), wherein a bushing material of medium-carbon steel is carburized and then cooled to an ambient temperature. Then, the bushing material is induction-heated from an outside surface of the bushing material only so that an entire cross section of a wall of the bushing material is heated, and then the bushing material is rapidly cooled from both the inside surface and the outside surface of the bushing material. Lastly, the bushing material is tempered. In this method, the required surface hardness is obtained through the carburizing and the heat treatment executed after the carburizing, and the required toughness is obtained through a residual compressive stresses produced at the inside and outside surfaces of the bushing material utilizing the difference in carbon content between the surface portions and the core portion of the bushing material due to the carburizing. More particularly, it is known that the more the carbon content is, the more the steel grain is expanded when quenched. Since the inside and outside surface portions of the bushing material include more carbon than the core portion, the surface portions will be more expanded than the core portion when quenched. Then, when the bushing material is rapidly cooled from both the inside and outside surfaces, a residual compressive stress is produced in the surface portions. When the bushing receives a compressive load at opposite outside surfaces, the compressive load generates a tensile stress at the opposite portions of the inside surface. Since the tensile stress is cancelled by the residual compressive stress, the toughness of the bushing is increased. Thus, in this method, the carburizing is indispensable for both increasing the surface hardness and the toughness of the bushing. This method will be called a third related art hereinafter.

A high carbon content bushing material is not used in the prior production methods because the necessary carbon content difference between the surface portions of the bushings and the core portion of the bushings would not be achieved. Without this carbon content differential between the core and surface portions of the bushing material, it was thought that the necessary residual compressive stresses could not be formed. Thus, the use of high carbon steel without carburizing has not previously been realized.

However, the first related art takes a relatively long time period to carburize the bushing material and is relatively expensive, because the case hardening steel is a low-carbon steel. The second related art also requires carburizing which takes a yet long time period. Further, the second related art requires two quenchings, i.e., quenching from the outside surface and then quenching from the inside surface. Therefore, the heat treatment requires a relatively long time and is expensive. The third related art requires carburizing. As a result, the third related art requires a yet long time period and is yet expensive.

OBJECT AND SUMMARY OF THE INVENTION

An object of the present invention is to provide a production method for an endless track bushing wherein carburizing can be eliminated as compared with the first through third related arts and an induction heating and rapid cooling step is reduced as compared with the second related art and wherein in spite of the elimination of carburizing and the reduction of the induction heating and rapid cooling step, the abrasion resistance quality at surfaces, and strength and toughness of the bushing are maintained to the same order as those of the first through third related arts.

The present invention allows for the use of a high carbon content material which has the necessary toughness even though there is no difference in the carbon content between the core portion and the surface portion of the bushing. The necessary toughness is achieved by the combination of a residual compressive stress at the inside surface of the bushing, created by the cooling direction of the quenching, and by a fine grain structure at the inside surface of the bushing, created by heating the bushing material to a temperature above and close to the transformation temperature.

The above-described object is achieved by a production method for an endless track bushing in accordance with the present invention. In the method of the present invention, high-carbon low-alloy steel (C: above 0.5% and equal to or below 1.0% by weight) is selected as the material for a bushing material so that the carbon content of the surface portions of the bushing material is as high as the carbon content obtained by carburizing in low-carbon and medium-carbon steel bushing materials. As a result, the carburizing is eliminated. More particularly, in the conventional case of using low-carbon steel or medium-carbon steel for the material of the bushing, carburizing was executed to increase the carbon content at surfaces of the bushing material from the content of 0.15-0.4% by weight to the content of about 0.8% by weight. However, in the present invention, since the material itself has a high carbon content, for example 0.8% by weight, the carburizing process can be eliminated. As a result, the cost and time period for the carburizing (about twenty-two hours with the low-carbon steel bushing material and about eleven hours with the medium-carbon steel bushing material) can be saved.

Then, the bushing material is induction-heated from an outside surface of the bushing material only so that an inside surface of the bushing material is heated to a temperature above and close to the transformation temperature of the high-carbon low-alloy steel of the bushing material. As a result of heating the inside surface to the temperature above and close to the transformation temperature, the steel grain of the inside surface and the portion adjacent the inside surface is controlled to a fine grain in size, so that the toughness of the bushing increases.

Then, the heated bushing material is rapidly cooled from the outside surface of the bushing material only so that the entire cross section of the wall of the bushing material is hardened. As a result of cooling from the outside surface only, a residual compressive stress is produced at the inside surface and in the portion adjacent the inside surface of the bushing material after the bushing material has been cooled to an ambient temperature. Since there is no difference in carbon content between the surface portions and the core portion of the bushing material of the invention, a residual compressive stress due to the carbon content difference is not produced in the bushing material of the invention unlike the first through third related arts. However, since the outside surface is cooled more rapidly than the inside surface in the invention and a temperature gradient is produced during cooling in the bushing material of the invention, a residual compressive stress is produced at the inside surface and the portion adjacent the inside surface, which cancels the tensile stress induced at the inside surface when a load acts on the bushing. As a result, the strength and toughness of the bushing of the invention increases. Further, since the entire cross-section of the wall is quenched from the outside surface only, the quenching step is reduced to about one half of the second related art where the bushing material is quenched from the outside surface and then from the inside surface.

Lastly, the bushing material is tempered at low temperatures.

The hardening may be performed through a stationary hardening method or a moving hardening method. In the stationary hardening method, the bushing material is rotated about an axis thereof within a induction heating coil, thereby heating an outside surface of the bushing material so that an entire wall cross-section is heated to the austenitizing temperature. The entire surface of the bushing material is then cooled by a coolant so that the bushing material is evenly hardened. In the moving hardening method, the bushing material is rotated within an induction heating coil and axially moved relative to the induction heating coil. The bushing material is induction-heated from the outside surface thereof so that the entire wall cross-section is heated to the austenitizing temperature and then cooled by a coolant from a cooling jacket which follows the heating coil.

BRIEF DESCRIPTION OF THE DRAWINGS

The above and other objects, features and advantages of the present invention will become apparent and will be more readily appreciated from the following detailed description of the preferred exemplary embodiments of the invention taken in conjunction with the accompanying drawings, in which.

PREFERRED EMBODIMENT OF THE INVENTION

FIG. 3 illustrates a bushing material 10 to which the production method of the present invention is applied. The bushing material 10 is cylindrical having an axis 10a and includes an outside surface 10b, a portion 10d adjacent the outside surface 10b, a core portion 10f, an inside surface 10c, and a portion 10e adjacent the inside surface 10c. The typical bushing material 10 has a length L of 158 mm, an outer diameter D1 of 66.7 mm, an inner diameter D2 of 44.8 mm, an outside surface end taper $\theta$ of 80°, a taper corner having a radius R1, R2 of 2 mm, and an inside surface end chamfer K of 2 mm.

The bushing material to be used in the production method of the present invention should comprise high-carbon low-alloy steel having 0.5%-1.0% (above 0.5% and equal to or below 1.0%) carbon by weight. The high-carbon low-alloy steel includes 0.3-2.0% manganese by weight, 0.1-1.2% chromium by weight, less than 0.35% molybdenum by weight, and 0.0005-0.0030% boron by weight. The above-defined content of manganese, chromium and molybdenum are determined to ensure hardenability, and the above-defined content of boron is determined to obtain toughness of the bushing. The high-carbon low-alloy steel should include boron and at least one of manganese, chromium and molybdenum. Table 1 shows the chemical composition of the high-carbon low-alloy steel suitable for use in the method according to the present invention. For reference, Table 1 also shows the chemical compositions of JIS SCM415 which was used in the first related art and of steel defined as ASCB4OH according to Japanese Automobile Industry Association Standard which was used in the second and third related arts.

TABLE 1

| Chemical Component | Steel Material | | |
|---|---|---|---|
| | JIS: SCM415 (first related art) | ASCB40H (second and third related arts) | high-carbon low-alloy steel (the present invention) |
| C | 0.16 (wt %) | 0.40 (wt %) | 0.80 (wt %) |
| Si | 0.24 | 0.19 | 0.26 |
| Mn | 0.65 | 0.71 | 1.60 |
| P | 0.018 | 0.029 | 0.022 |
| S | 0.004 | 0.010 | 0.019 |
| Ni | 0.02 | 0.05 | 0.06 |
| Cr | 0.98 | 0.90 | 0.17 |
| Cu | 0.02 | 0.08 | 0.09 |
| Mo | 0.21 | 0.02 | 0.02 |
| Al | 0.032 | 0.018 | 0.033 |
| Ti | — | 0.034 | 0.035 |
| B | — | 0.0013 | 0.0018 |

The bushing material having the above-described composition is heat-treated according to the heat treatment specifications shown in Table 2. Table 2 also shows the heat treatment specifications of the first through third related arts for comparison.

TABLE 2

| Method | Material | Heat treatment | Details |
|---|---|---|---|
| first related art | SCM415 | carburizing | 950° C. * 22 hours cooling in a furnace |
| | | quench-hardening | heating at 850° C. and cooled by oil |
| | | tempering | 200° C. |
| second related art | ASCB40H | carburizing | 950° C. * 11 hours cooling in a furnace |
| | | quench-hardening | quench-hardening from the outside surface and then from the inside surface |
| | | tempering | 200° C. |
| third related art | ASCB40H | carburizing | 950° C. * 11 hours cooling in a furnace |
| | | quench-hardening | cooling from both the outside and inside surfaces |
| | | tempering | 200° C. |
| present invention | high-carbon low-alloy steel | quench-hardening | quench-hardening from outside surface only |
| | | tempering | 150° C.-200° C. |

The specification of a high-frequency induction heating of the quench-hardening of Table 2 is shown in more detail in Table 3. Table 3 also shows the second and third related arts for comparison.

TABLE 3

| Specifications | Second related art | Third related art | The present invention |
|---|---|---|---|
| Heating | From outside surface | From inside surface | From outside surface only, 950° C. at inside surface | From outside surface only, 860° C. at inside surface |
| Frequency (kHz) | 3 | 20 | 3 | 1 |
| Output (kW) | 121 | 82 | 121 | 144 |
| Moving speed (mm/sec) | 8.4 | 6.5 | 7.6 | 9.5 |

The heat treatment of the present invention includes induction-heating the bushing material from the outside surface only so that the inside surface is heated to a temperature above and close to the $Ac_3$ transformation temperature (between the $Ac_3$ transformation temperature and the $Ac_3$ transformation temperature $+50°$ C.) or to a temperature above and close to the $Ac_1$ transformation temperature (between the $Ac_1$ transformation temperature and the $Ac_1$ temperature $+50°$ C.) and quenching an entire cross section of the wall of the bushing material by cooling from the outside surface only with coolant (water soluble), and then tempering the bushing material at low temperatures (150° C.-250° C.).

As a result of heating the inside surface to the temperature above and close to the transformation temperature, the steel grain at the inside surface and the portion adjacent the inside surface is fine. More particularly, the grain size of the inside surface and the portion adjacent the inside surface of the bushing produced in accordance with the present invention is about 8.8 to 9.3 in austenite grain size number, while the grain size of the third related art is 8.5-9.3. In this instance, the greater the grain size number is, the finer the grain is. The fine steel grain suppresses crack initiation of the bushing and increases the toughness of the bushing.

As a result of rapidly cooling the bushing material from the outside surface only, a gradient of temperature is produced in the wall of the bushing material during the cooling, because the outside surface is more rapidly cooled than the inside surface, and a residual compressive stress is produced at the inside surface and the portion adjacent the inside surface when the bushing material has been cooled to the ambient temperature. This residual compressive stress cancels the tensile stress which is generated at the inside surface of the bushing when a compressive load acts on the bushing. As a result, the toughness of the bushing increases to a great extent.

In the first through third related arts, the difference of carbon content between the surface portions and the core portion induces a difference in expansion of a grain during transformation into markensite when the bushing material is quenched and generates a residual compressive stress at the surface portions. However, since there is no difference in carbon content between the surface portions and the core portion with the bushing material of the present invention and no carburizing is applied to the bushing material, the difference of carbon content cannot be used for generating a residual compressive stress in the present invention. A temperature gradient produced by cooling the bushing material from the outside surface only is used for producing the residual compressive stress in the present invention. The residual compressive stress produced at the inside surface portion of the bushing in accordance with the present invention is about 10 Kg/mm$^2$ at the maxim (0–10 Kg/mm$^2$), while the residual compressive stress of the third related art is 20–30 Kg/mm$^2$. Since the residual compressive stress obtained in the invention is less than that obtained in the third related art, the grain control discussed above is added in the invention so that a toughness substantially equal to that of the third related art is obtained in the bushing in accordance with the present invention.

The bushing material which has been heat-treated in accordance with the specifications of Table 2 and Table 3 will hereinafter be called a bushing.

The heat treatment results, that is, the cross-section hardnesses and toughness of the bushings heat-treated according to the above-described specifications will be explained in detail below.

Figure 4:
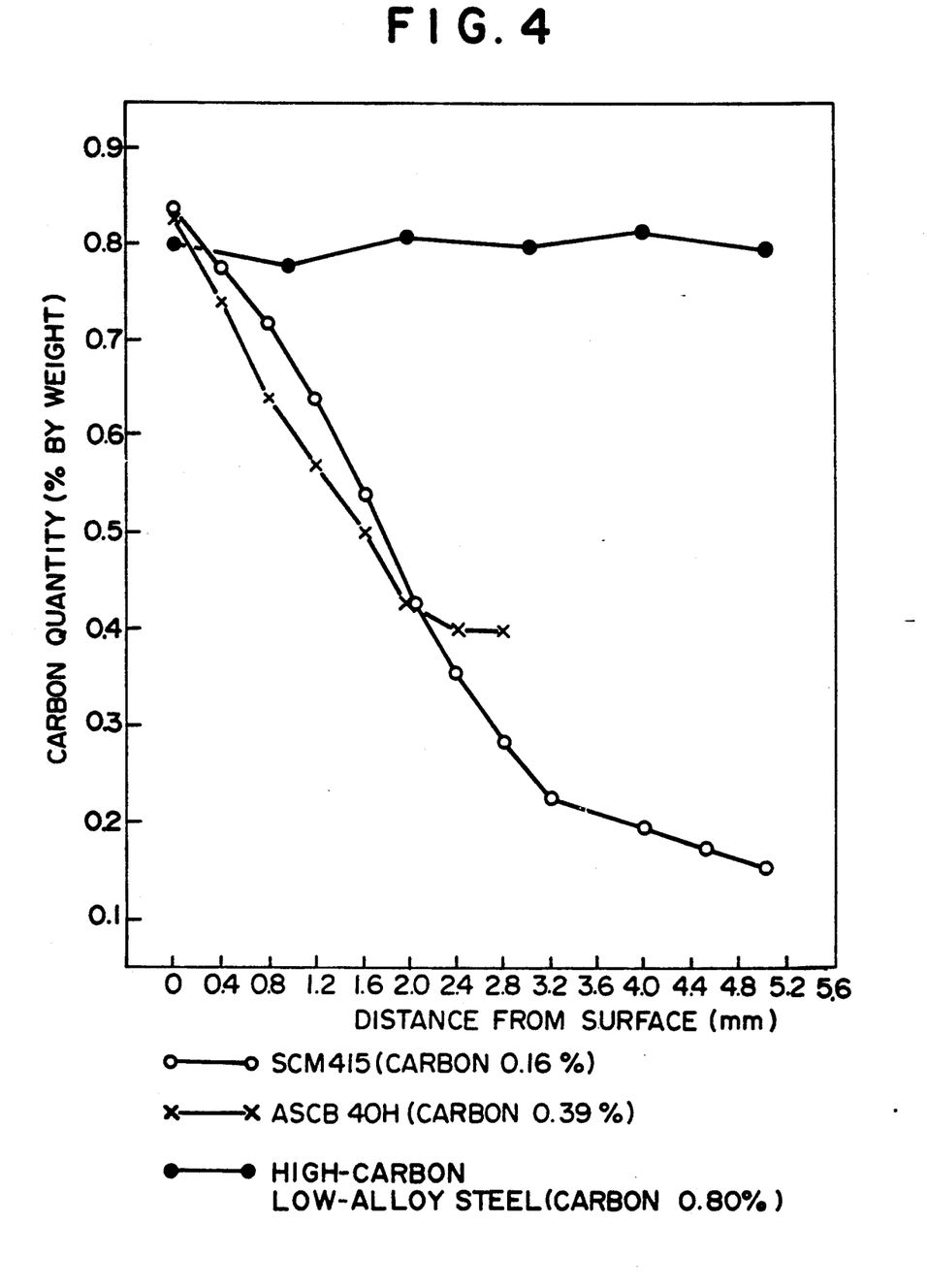
FIG. 4 is a graph illustrating distributions of carbon quantity in the first through third related arts and the present invention.

FIG. 4 illustrates the carbon quantity included in the carburized layer of the bushings heat-treated according to the carburizing methods according to the first through third related arts and measured by an X-ray micro-analyzer and the carbon quantity included in the bushing material of the present invention. As seen in FIG. 4, when it is defined that a carbon quantity to be included in an effective carburized layer is at least 0.4% by weight, the effective carburized layer of the bushing produced according to the first related art has 2.2 mm depth and the effective carburized layer of the bushing produced according to the second and third related arts has 2.4 mm depth. In contrast, in the present invention, the carbon content is more than 0.5% by weight throughout the entire thickness of the wall of the bushing. Therefore, the entire thickness is deemed to be carburized.

FIGS. 5–8 illustrate hardness distributions in walls of the bushings produced according to the first through third related arts and the present invention, respectively.

Figure 5:
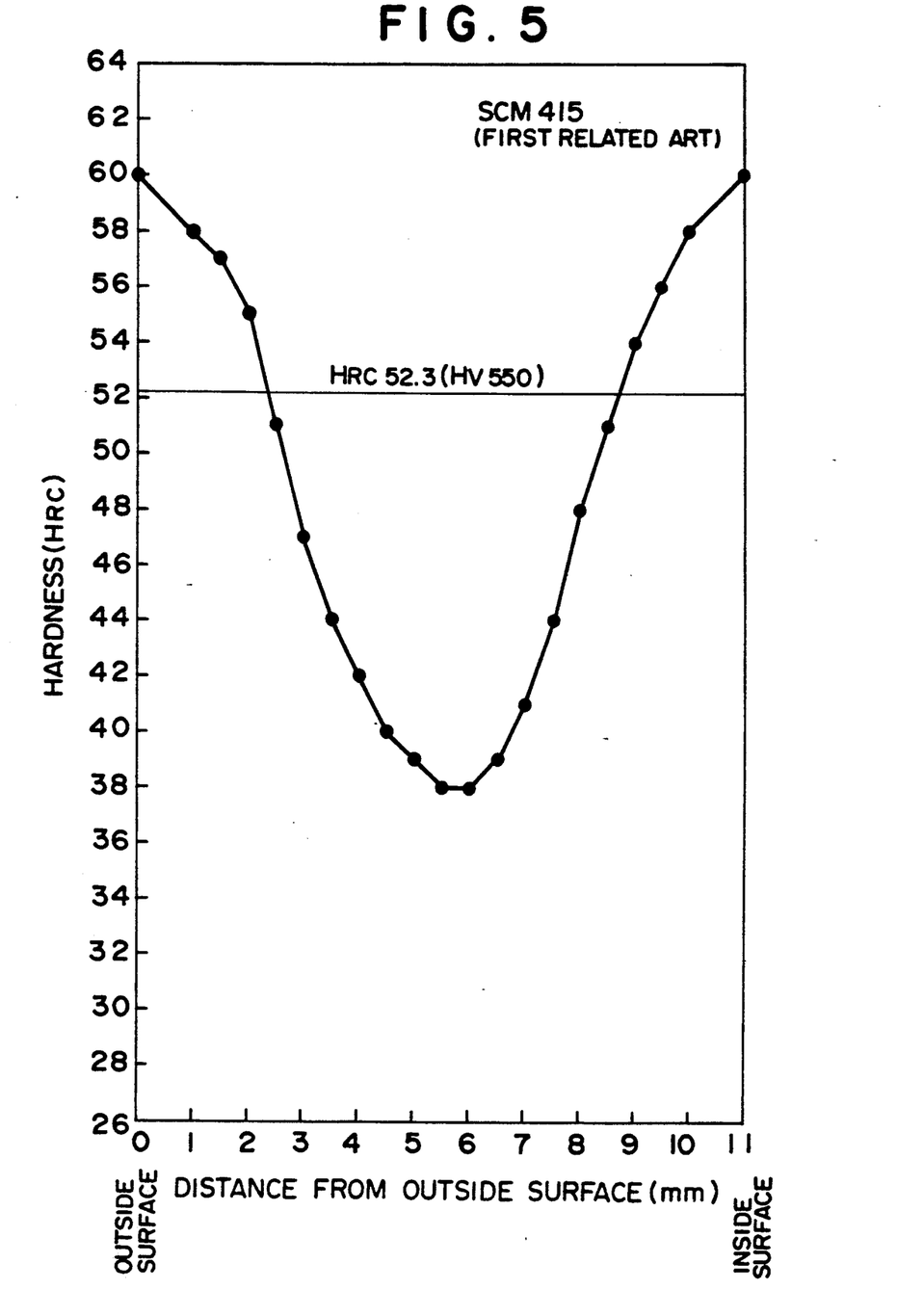
FIG. 5 is a graph illustrating a hardness distribution in a wall of a bushing heat-treated according to the first related art.

As seen in FIG. 5, the depth of the effective hardness layer of the bushing heat-treated according to the method of the first related art is 2.3–2.4 mm, when an effective hardness layer is defined as a layer having a hardness greater than Rockwell Hardness C-Scale 52.3 (Vickers Hardness Scale 550) according to JIS (Japanese Industrial Standard). The effective hardness layer depth is substantially equal to 2.2 mm depth of the carburized layer having at least 0.4% carbon by weight.

Figure 6:
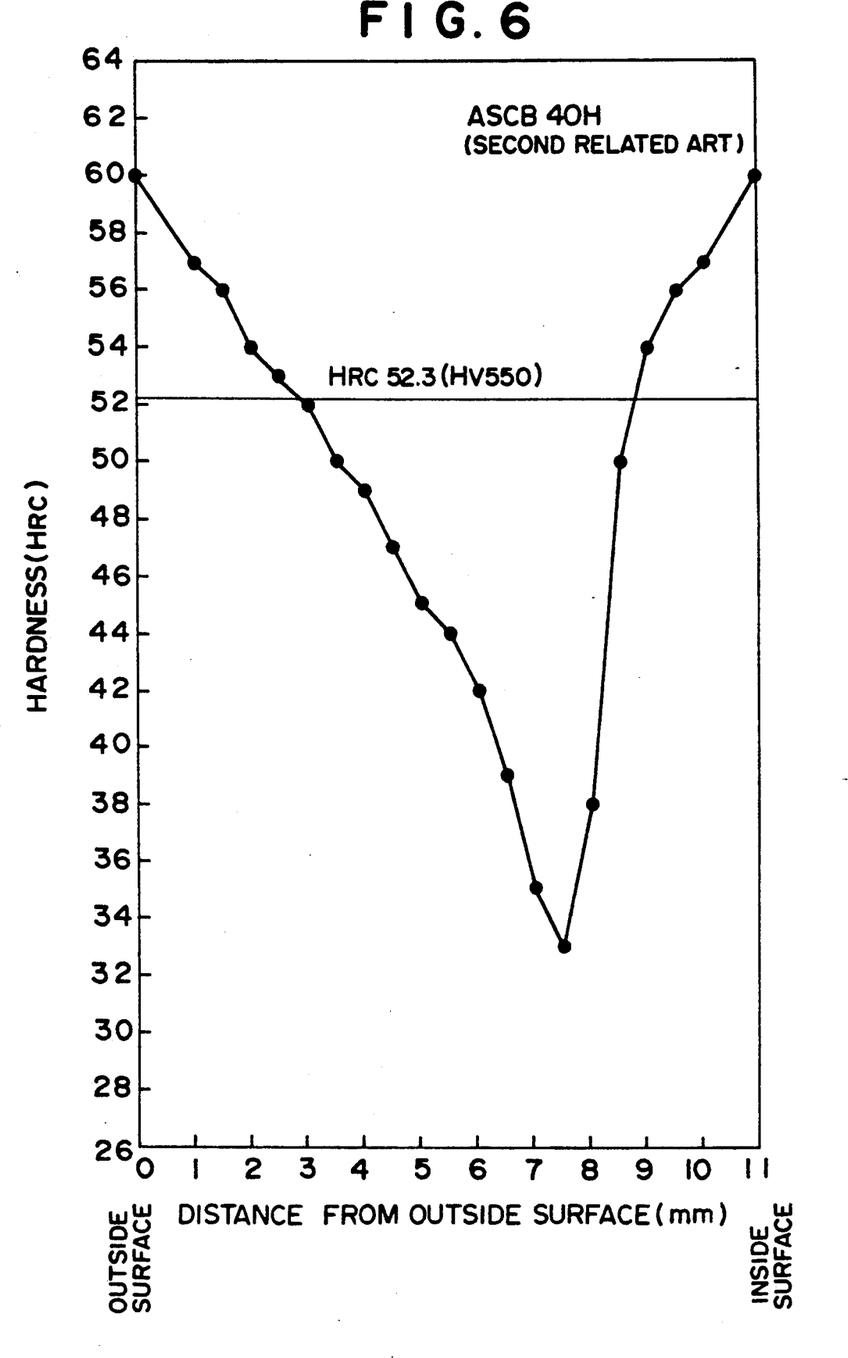
FIG. 6 is a graph illustrating a hardness distribution in a wall of a bushing heat-treated according to the second related art.

As seen in FIG. 6, the depth of the effective hardness layer of the bushing heat-treated according to the method of the second related art is 2.2 mm at the inside surface portion thereof and 2.8 mm at the outside surface portion thereof. The depth of the effective hardness layer at the outside surface portion is slightly greater than the 2.4 mm depth of the carburized layer having at least 0.4% carbon by weight. This means that hardening effect due to heating extends beyond the carburized layer obtained in the carburizing of a bushing made from medium-carbon steel. This effect can be seen in FIG. 6.

Figure 7:
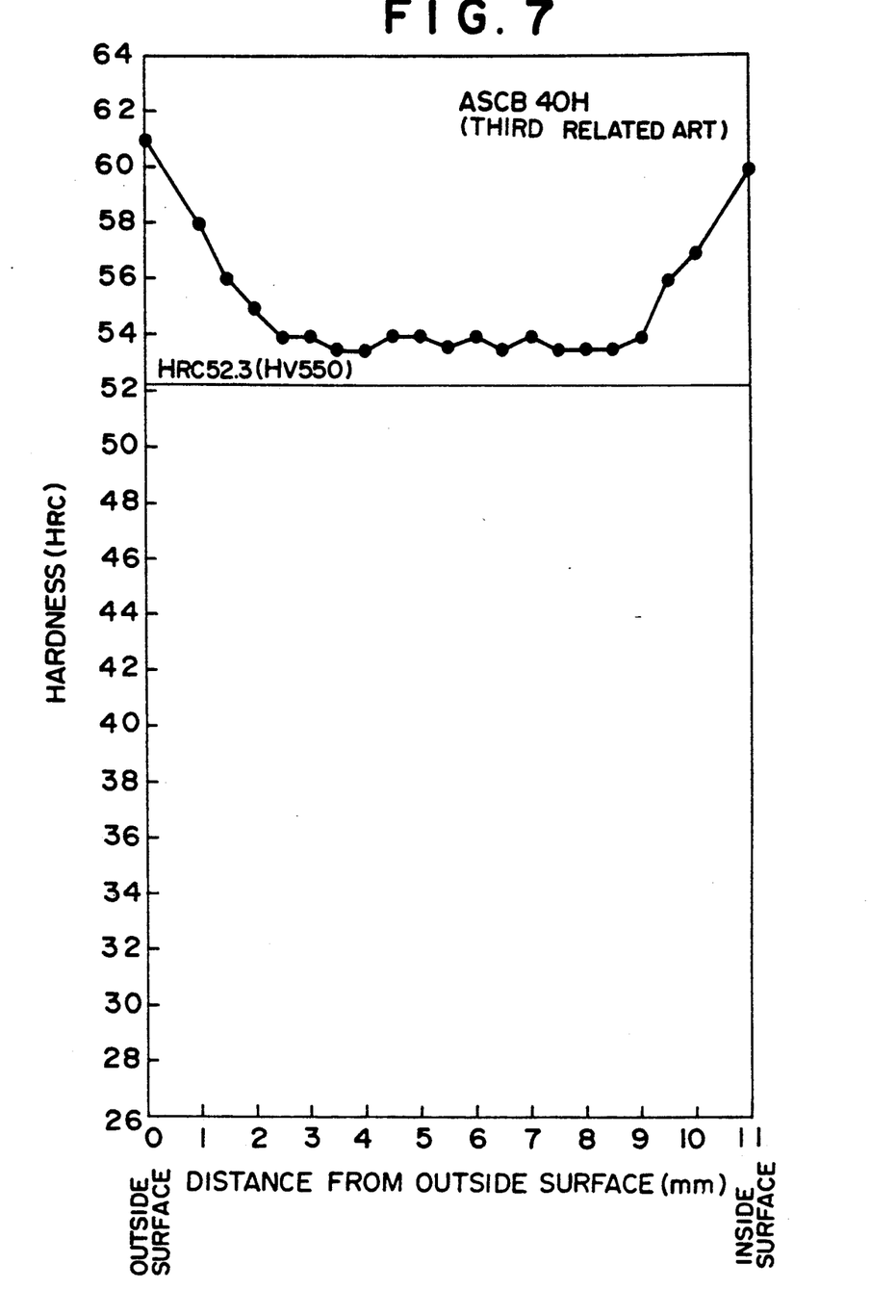
FIG. 7 is a graph illustrating a hardness distribution in a wall of a bushing heat-treated according to the third related art.

As seen in FIG. 7, the entire cross section of the wall of the bushing heat-treated according to the third related art is hardened to a hardness greater than HRC 52.3, though the carburized layer of the bushing heat-treated according to the method of the third related art is of substantially the same order as that of bushing heat-treated according to the method of the second related art.

Figure 8:
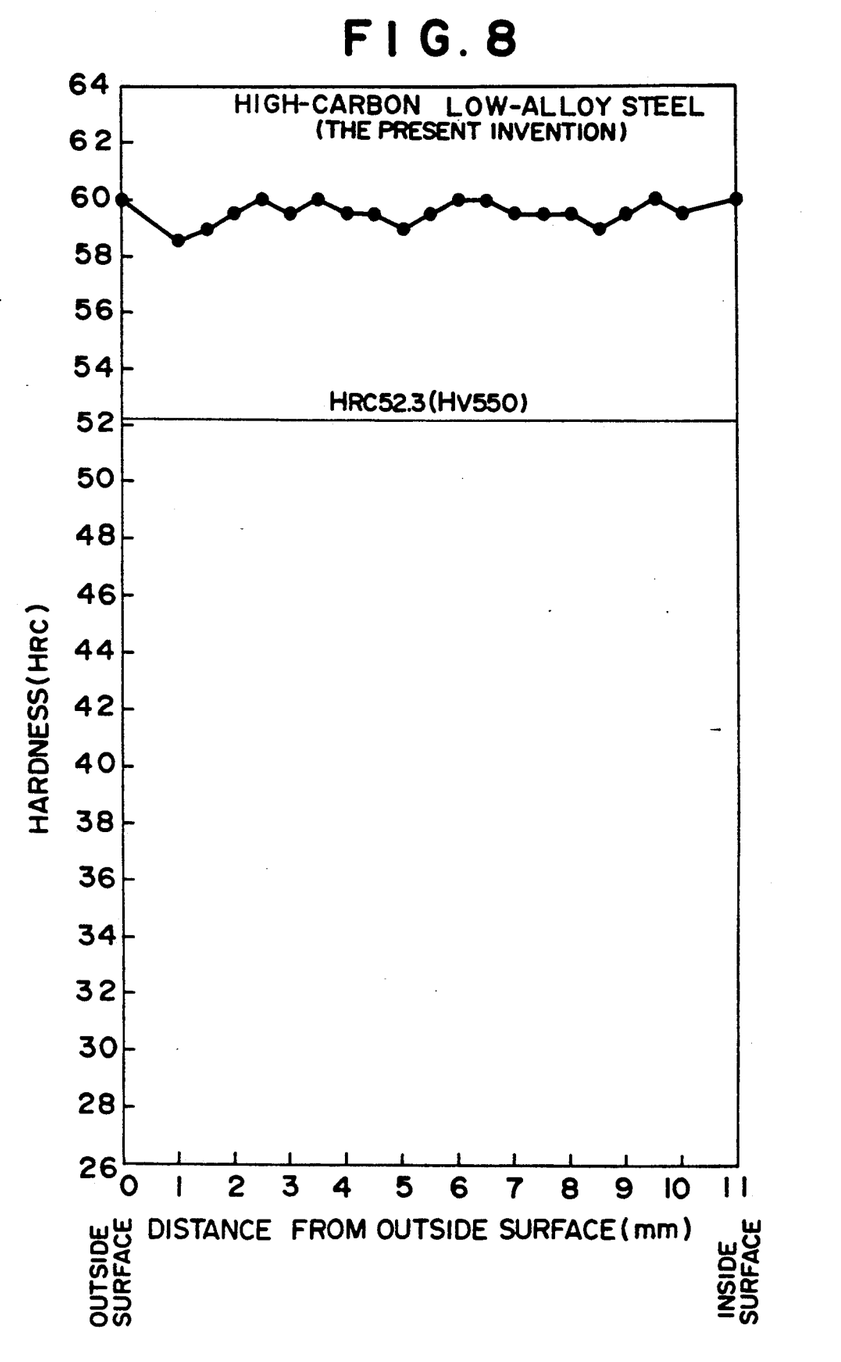
FIG. 8 is a graph illustrating a hardness distribution in a wall of a bushing heat-treated according to the present invention.

As seen in FIG. 8, the entire cross section of the wall of the bushing heat-treated according to the present invention has a constant hardness of about HRC 60. The present invention is similar to the third related art in that the entire wall is hardened to a hardness greater than HRC 52.3, but the present invention differs from the third related art in that the core portion has substantially the same hardness as that of the surface portion in the present invention while the core portion has a lower hardness (lower by HRC 6-7) than that of the surface portion in the third related art. As a result, the bushing produced according to the method of the present invention has a further improved abrasion-proof characteristic as compared to the third related art.

Comparing the hardness of the surface portion of the bushing produced according to the method of the present invention with that of the bushings produced according to the first and second related arts, there is no great difference in hardness between them. However, the hardness of the core portions of the bushings of the first and second related arts is much lower than the hardness of the surface portions, while the hardness of the core portion of the bushing produced according to the method of the present invention is substantially equal to that of the surface portion. Therefore, the abrasion-proof characteristic of the bushing produced according to the present invention is much greater than that of the bushings produced according to the first and second related arts.

Figure 9:
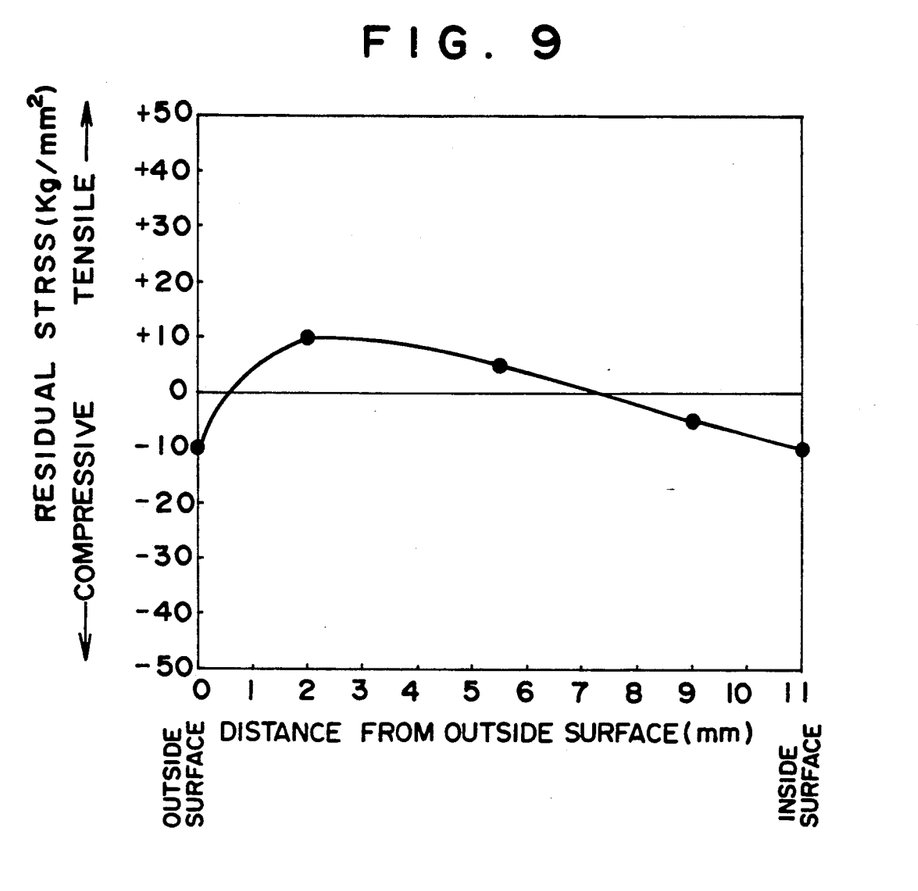
FIG. 9 is a graphical representation of a distribution of a residual stress of the bushing produced in accordance with the method of the present invention.

FIG. 9 illustrates a distribution of the residual stress in the wall of the bushing produced in accordance with the method of the present invention. As can be seen from FIG. 9, a residual compressive stress is produced at the inside surface and the portion adjacent the inside surface. The magnitude of the residual compressive stress is about 10 Kg/mm$^2$.

Figure 10:
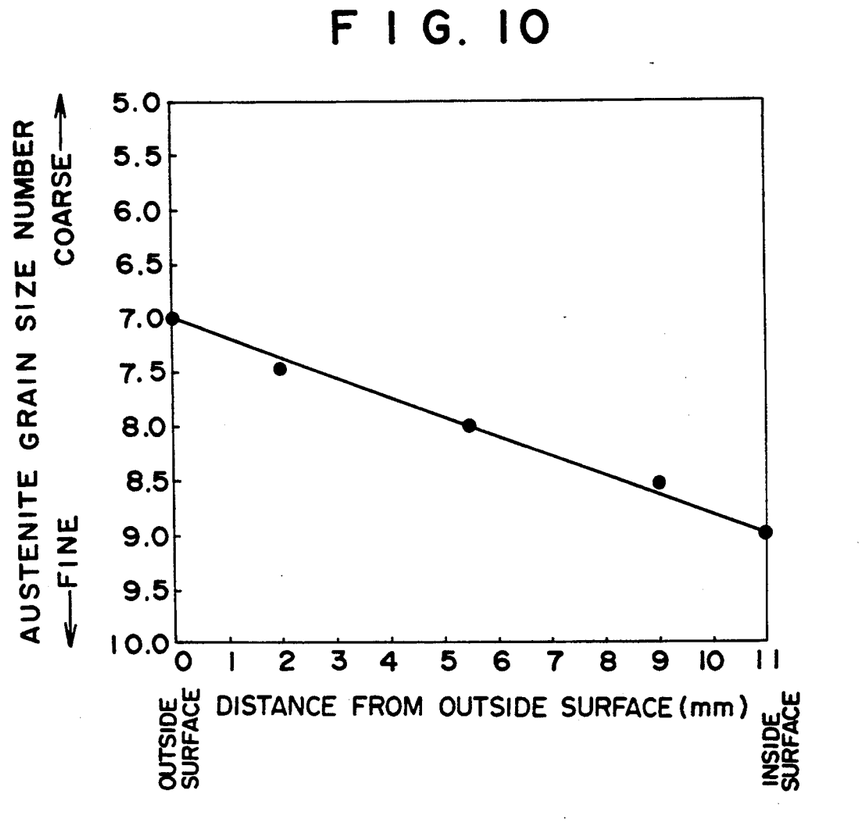
FIG. 10 is a graphical representation of an austenite grain size distribution in a wall of the bushing produced in accordance with the present invention.

FIG. 10 illustrates a distribution of the grain size of the wall of the bushing produced in accordance with the method of the present invention. As can be seen from FIG. 10, a fine grain of the austenite grain size number of about 9 is formed at the inside surface and in the portion adjacent the inside surface.

Figure 11:
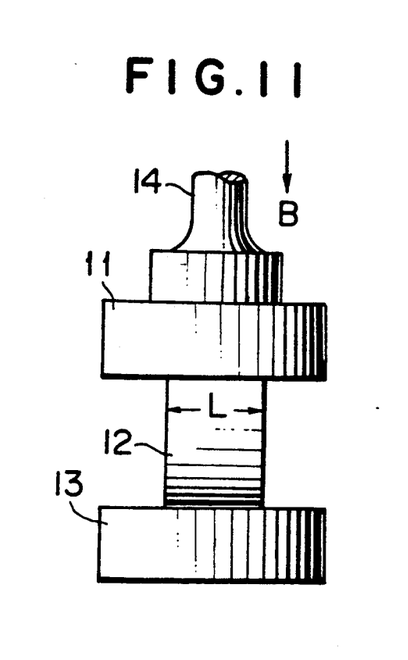
FIG. 11 is a front elevational view of a crushing test rig.
Figure 12:
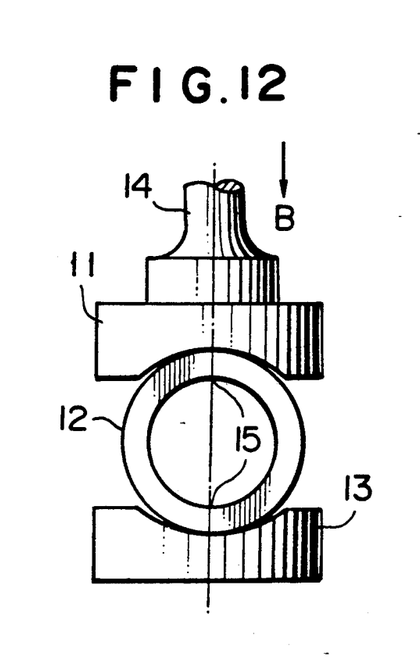
FIG. 12 is a side elevational view of the test rig of FIG. 11.

FIG. 11 illustrates a crushing test rig. In the crushing test, the test piece 12 was prepared by cutting the bushing having the configuration shown in FIG. 3 to a length L of 30 mm. The length of the test piece was determined from the capacity of the test rig and had no other technical meaning. The members denoted by reference numerals 11 and 13 are compressors to compress the test piece 12 therebetween. Member 13 is stationary while member 11 compresses in a direction shown by arrow B. The test rigs 11 and 13 were mounted to a compression force loading machine and a load was added in the direction B to cause a crack in the test piece at positions 15. A crushing load was defined as a maximum load before the crack initiated. A crushing deformation was defined as a deformation of the test piece at the time when the maximum load was loaded. Table 4 illustrates the test results.

TABLE 4

| Test piece | Crushing load (ton) | Crushing deformation (mm) |
|---|---|---|
| SCM 415 first related art | 5.3–12.8 | 0.60–1.20 |
| ASCB40H second related art | 10.4–17.0 | 1.05–1.60 |
| ASCB40H third related art | 12.8–22.4 | 0.95–2.30 |
| high-carbon low-alloy steel the present invention | 7.7–12.4 | 0.75–1.20 |

As seen in Table 4, the bushing heat-treated according to the method of the present invention has substantially the same crushing load and deformation as those of the bushings heat-treated according to the method of the first related art, though the crushing load and deformation are inferior to those of the bushings heat-treated according to the methods of the second and third related arts. Since the first related art has been actually used in the field and has caused no problem from the viewpoint of crushing load and deformation, it can be understood that the method of the present invention will cause no problem from the viewpoint of the crush-proof characteristic.

Several advantages can be obtained by use of the present invention.

First, because high-carbon low-alloy steel (0.5–1.0% carbon content by weight) is selected as the bushing material, a carburizing process can be eliminated in ensuring a necessary carbon content at surfaces of the bushing.

Second, because induction hardening is performed from an outside surface of a bushing material only, the induction hardening step is reduced to one half of that of the second related art.

Third, despite the elimination of carburizing process and the reduction of the induction hardening step, strength and toughness of the bushing are maintained substantially equal to those of the bushings heat-treated according to the methods of the first through third related arts.

Fourth, though the hardness of core portions of bushings heat-treated according to the methods of the first through third related arts is less than the hardness of surface portions (about HRC 60), the hardness of the bushing heat-treated according to the method of the present invention is about HRC 60 throughout the entire wall including the core portion. As a result, abrasion resistance of the bushing produced according to the method of the present invention is conspicuously improved as compared with the bushings produced according to the methods of the first and third related arts.

Although only one embodiment of the present invention has been described above in detail, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the invention as defined by the appended claims.

What is claimed is:

1. A production method for a vehicular endless track bushing comprising the steps of:

preparing a cylindrical bushing material having an outside surface, a first portion adjacent the outside surface, a core portion, an inside surface, a second portion adjacent the inside surface, and a hardness of about HRC 60 throughout an entire cross section of said bushing material;

during said step of preparing the bushing material, placing the first and second portions in a condition in which the first and second portions include 0.5–1.0% carbon by weight, by selecting high-carbon low-alloy steel which includes 0.5–1.0% carbon by weight for a steel material of the bushing material;

induction-heating the bushing material of high-carbon low-alloy steel from an outside surface of the bushing material only, said induction-heating being performed without pre-carburizing the bushing material before the induction-heating;

during said step of induction-heating, producing a fine steel grain at the inside surface and in the second portion of the bushing material by maintaining the temperature of the inside surface and the second portion of the bushing material to a temperature above a transformation temperature of the high-carbon low-alloy steel and below a temperature of the transformation temperature plus 50° C.;

rapidly cooling the bushing material from the outside surface only so that an entire cross section of the bushing material is quench-hardened;

during said step of cooling, cooling the outside surface and the first portion of the bushing material more rapidly than the inside surface and the second portion of the bushing material to thereby produce a residual compressive stress at the inside surface and in the second portion of the bushing material when the bushing material is cooled to an ambient temperature; and tempering the bushing material at low temperatures.

2. A method according to claim 1, wherein the high-carbon low-alloy steel includes 0.3–2.0% manganese by weight.

3. A method according to claim 1, wherein the high-carbon low-alloy steel includes 0.1–1.2% chromium by weight.

4. A method according to claim 1, wherein the high-carbon low-alloy steel includes less than 0.35% molybdenum by weight.

5. A method according to claim 1, wherein the high-carbon low-alloy steel includes 0.0005–0.0030% boron by weight.

6. A method according to claim 1, wherein the inside surface and the second portion of the bushing material is made fine in steel grain size to a size in the range of 8.8–9.3 in austenite grain size number.

7. A method according to claim 1, wherein the residual compressive stress produced at the inside surface and in the second portion of the bushing material is in a range of 0.1-10 Kg/mm².

8. A method according to claim 1, wherein the tempering is performed at 150° C.-250° C.

9. A production method for a vehicular endless track bushing comprising the steps of:

preparing a cylindrical bushing material having an outside surface, a first portion adjacent the outside surface, a core portion, an inside surface, and a second portion adjacent the inside surface;

during said step of preparing the bushing material, placing the first and second portions in a condition in which the first and second portions include 0.5-1.0% carbon by weight, by selecting high-carbon low-alloy steel which includes 0.5-1.0% carbon by weight for a steel material of the bushing material;

induction-heating the bushing material of high-carbon low-alloy steel from an outside surface of the bushing material only, said induction-heating being performed without pre-carburizing the bushing material before the induction-heating;

during said step of induction-heating, producing a fine steel grain at the inside surface and in the second portion of the bushing material by maintaining the temperature of the inside surface and the second portion of the bushing material to a temperature above a transformation temperature of the high-carbon low-alloy steel and below a temperature of the transformation temperature plus 50° C.;

rapidly cooling the bushing material from the outside surface only so that an entire cross section of the bushing material is quench-hardened;

during said step of cooling, cooling the outside surface and the first portion of the bushing material more rapidly than the inside surface and the second portion of the bushing material to thereby produce a residual compressive stress at the inside surface and in the second portion of the bushing material in a range of 0.1-10 Kg/mm² when the bushing material is cooled to an ambient temperature; and tempering the bashing material at low temperatures.

10. A method according to claim 9, wherein the high-carbon low-alloy steel includes 0.3-2.0% manganese by weight.

11. A method according to claim 9, wherein the high-carbon low-alloy steel includes 0.1-1.2% chromium by weight.

12. A method according to claim 9, wherein the high-carbon low-alloy steel includes less than 0.35% molybdenum by weight.

13. A method according to claim 9, wherein the high-carbon low-alloy steel includes 0.0005-0.0030% boron by weight.

14. A method according to claim 9, wherein the entire cross section of the bushing material is hardened to a hardness about HRC 60.

15. A method according to claim 9, wherein the inside surface and the second portion of the bushing material is made fine in steel grain size to a size in the range of 8.8-9.3 in austenite grain size number.

16. A method according to claim 9, wherein the tempering is performed at 150° C.-250° C.

* * * * *